United States Patent
Kim et al.

(10) Patent No.: US 9,862,278 B2
(45) Date of Patent: Jan. 9, 2018

(54) METHOD AND DEVICE FOR CONTROLLING HYBRID STARTER GENERATOR OF HYBRID ELECTRIC VEHICLE

(71) Applicant: Hyundai Motor Company, Seoul (KR)

(72) Inventors: Sang Joon Kim, Seuol (KR); Joon Young Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/959,868

(22) Filed: Dec. 4, 2015

(65) Prior Publication Data

US 2017/0066333 A1 Mar. 9, 2017

(30) Foreign Application Priority Data

Sep. 9, 2015 (KR) .................. 10-2015-0127534

(51) Int. Cl.
| | | |
|---|---|---|
| *B60L 11/00* | (2006.01) | |
| *B60L 11/14* | (2006.01) | |
| *B60W 10/08* | (2006.01) | |
| *B60W 20/00* | (2016.01) | |

(52) U.S. Cl.
CPC .............. *B60L 11/14* (2013.01); *B60W 10/08* (2013.01); *B60W 20/00* (2013.01); *B60L 2240/423* (2013.01); *B60L 2270/00* (2013.01); *Y02T 10/642* (2013.01); *Y02T 10/70* (2013.01); *Y02T 10/7077* (2013.01); *Y10S 903/902* (2013.01)

(58) Field of Classification Search
CPC ...... B60W 10/06; B60W 20/11; B60W 10/26; B60W 10/10; B60K 6/485
USPC .................. 701/22; 180/65.265; 903/930
See application file for complete search history.

(56) References Cited

U.S. PATENT DOCUMENTS

| | | | | |
|---|---|---|---|---|
| 8,447,449 | B2* | 5/2013 | Prucka ................. | B60K 6/485 180/178 |
| 9,045,136 | B2* | 6/2015 | Frank .................... | B60W 20/20 |
| 2009/0195203 | A1 | 8/2009 | Yurgil | |
| 2015/0258984 | A1* | 9/2015 | Atluri ................... | B60W 10/06 701/22 |

FOREIGN PATENT DOCUMENTS

| | | |
|---|---|---|
| JP | 2012-162231 A | 8/2012 |
| JP | 2013-166464 A | 8/2013 |
| JP | 2015-033966 A | 2/2015 |
| KR | 10-2009-0022084 A | 3/2009 |
| KR | 10-2012-0136829 A | 12/2012 |
| KR | 10-2014-0106028 A | 9/2014 |

\* cited by examiner

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A method and device for controlling a hybrid starter generator (HSG) of a hybrid electric vehicle (HEV) can distinguish a section in which tension influencing durability of a belt connected between an internal combustion engine and the HSG increases, and another section in which the tension decreases, in order to restrict a change in torque of the HSG connected to the belt.

10 Claims, 4 Drawing Sheets

METHOD AND DEVICE FOR CONTROLLING HYBRID STARTER GENERATOR OF HYBRID ELECTRIC VEHICLE

CROSS-REFERENCE TO RELATED APPLICATION

This application claims under 35 U.S.C. §119(a) the benefit of Korean Patent Application No. 10-2015-0127534 filed on Sep. 9, 2015, the entire contents of which are incorporated herein by reference.

BACKGROUND (a) Technical Field

The present invention relates to a method and a device for controlling an electric power source such as a hybrid starter generator (HSG) of a hybrid electric vehicle (HEV), more particularly, it relates to a method and a device for controlling a change in torque of the electric power source connected to an internal combustion engine through a belt in the HEV by distinguishing situations in which tension influencing durability of a belt increases and does not increase in the HEV.

(b) Description of the Related Art

In general, a system connecting driving force by using a belt exists in a hybrid electric vehicle (HEV), and there are many cases in which an electric power source such as a hybrid starter generator (HSG) connected with an internal combustion engine is connected by the belt to serve to start the engine, output driving force, charge a battery, and the like.

The durability of the belt is influenced by a degree of tension required to pull the belt, and controlling a separate electric motor for preventing deterioration of durability is required.

In general, in a system in which the internal combustion engine and the electric power source are connected to each other by the belt, since rotational inertia of the intern combustion engine is still larger than that of the electric power source, control to prevent deterioration of the durability is performed by restricting a torque change rate of the electric power source.

However, when a uniform torque change rate is applied as described above, even at the time of performing control in which an absolute value of torque output from the electric power source decreases, a torque control speed of the electric power source decreases due to the restricted change rate, thereby influencing a control response. In a situation in which the torque absolute value of the electric power source actually decreases, the tension to pull the belt decreases, therefore, the belt durability is not influenced.

Accordingly, it would be desirable to restrict the change in torque of the electric power source by distinguishing the situations in which the tension influencing the durability of the belt increases and does not increase.

FIG. 1 (RELATED ART) is a configuration diagram illustrating a system connecting driving force by using a belt in a hybrid electric vehicle and illustrates a connection state of a hybrid starter generator (HSG) 70 which is an electric power source, a battery 60, an inverter 50, a driving motor 30, an engine clutch 20, a transmission 40, and a differential device 90 connected with an internal combustion engine 10 through a belt 80, and illustrates a system having a structure including an electrical path between the HSG 70 and the driving motor 30 and a mechanical path between the internal combustion engine 10, and the driving motor 30 and a wheel 100.

The transmission 40 may be constituted by an automatic transmission (AT) and multispeed transmissions including a double clutch transmission (DCT), and the like.

In such a system, a hydraulic control unit (HCU) performs control of the HSG 70 for controlling engine stop, a motor control unit (MCU) performs control of the HSG 70 and the driving motor 30, the transmission control unit (TCU) performs transmission control, and an engine management system (EMS) performs engine torque control.

The tension to influence the durability of the belt is a pulling force which is applied to the belt while the HSG 70 does not output the torque, and when the engine 10 outputs the torque, since inertia of the HSG 70 is relatively smaller than that of the engine 10, the durability of the belt is not significantly affected. However, when the HSG 70 outputs the torque to pull the engine 10, the durability of the belt needs to be considered due to a difference in inertia and a slew rate of the torque outputted by the HSG 70.

In a situation in which an absolute value of the torque of the HSG increases, the tension increases, which influences the durability of the belt depending on the tension; and in a situation in which the absolute value of the torque decreases, the tension is changed to decrease, which does not exert a large influence on the durability of the belt.

In other words, controlling a torque change rate of the HSG by distinguishing a situation in which the tension increases and a situation in which the tension decreases is required.

The slew rate as a gradient and a change rate of a line, which increase to a maximum value, may be regarded as a slope of the torque which is changed with time.

A line diagram illustrated in FIG. 2A represents a target torque of the electric power source (hybrid starter generator, or HSG) and a line diagram illustrated in FIG. 2B represents an actual torque of the HSG depending on the restriction of the slew rate.

As illustrated in FIG. 2, when a single slew rate is applied to the entire section of the torque control of the electric power source, a phenomenon in which a response is delayed in the entire torque area occurs.

The above information disclosed in this Background section is only for enhancement of understanding of the background of the invention and therefore it may contain information that does not form the prior art that is already known in this country to a person of ordinary skill in the art.

SUMMARY

The present invention provides a method and a device for controlling a hybrid starter generator (HSG) of a hybrid electric vehicle (HEV), which can distinguish a section in which tension influencing durability of a belt connected between an internal combustion engine and the HSG increases, and another section in which the tension decreases, in order to restrict a change in torque of the HSG connected to the belt.

In one aspect, the present invention provides a control method for restricting a change in torque of an electric power source connected with an internal combustion engine through a belt in a hybrid electric vehicle in which a change rate of a target torque is controlled by distinguishing a section in which an absolute value of the target torque of the electric power source increases and a section in which the absolute value decreases.

In a preferred embodiment, in the section in which the absolute value of the target torque decreases, the change rate of the target torque may be determined to be a larger value than in the section in which the absolute value of the target torque increases.

In another aspect, the present invention provides a control method for restricting a change in torque of an electric power source connected with an internal combustion engine through a belt in a hybrid electric vehicle in which an actual torque determined according to a change rate of a target torque of the electric power source is monitored to be fed back as a previous torque value and the change rate of the target torque is determined based on increase and decrease states of the previous torque value and the target torque.

In a preferred embodiment, the change rate of the target torque when the previous torque value has a negative (−) value may be determined to be a larger value than the change rate of the target torque when the previous torque value has a positive (+) value in a section in which the target torque increases.

In another preferred embodiment, the change rate of the target torque when the previous torque value has the positive (+) value may be determined to be the larger value than the change rate of the target torque when the previous torque value has the negative (−) value in a section in which the target torque decreases.

In still another aspect, the present invention provides a control device for restricting a change in torque of an electric power source connected with an internal combustion engine through a belt in a hybrid electric vehicle, including: a target torque control unit controlling target torque of the electric power source; and a slew rate limiter arranged in the target torque control unit and variably controlling a change rate of the target torque.

In a preferred embodiment, the slew rate limiter may control a change rate of the target torque by distinguishing a section in which an absolute value of the target torque of the electric power source increases and a section in which the absolute value decreases and in detail, in the section in which the absolute value of the target torque decreases, the slew rate limiter may determine the change rate of the target torque to be a larger value than in the section in which the absolute value of the target torque increases.

In another preferred embodiment, the slew rate limiter may monitor an actual torque determined according to a change rate of a target torque of the electric power source as a previous torque value and determine the change rate of the target torque based on increase and decrease states of the previous torque value and the target torque.

In still another preferred embodiment, the slew rate limiter may determine the change rate of the target torque when the previous torque value has a negative (−) value to be a larger value than the change rate of the target torque when the previous torque value has a positive (+) value in a section in which the target torque increases and the slew rate limiter may determine the change rate of the target torque when the previous torque value has the positive (+) value to be the larger value than the change rate of the target torque when the previous torque value has the negative (−) value in a section in which the target torque decreases.

In yet another preferred embodiment, the target torque may be a torque in a square wave form having both the negative (−) value and the positive (+) value.

According to a method for controlling an HSG connected with a belt in a hybrid electric vehicle, a slew rate of an electric power source (HSG) is differentiated by distinguishing a section in which tension influencing durability of a belt increases and a section in which the tension decreases to quicken a response in a section (a section in which an absolute value of a torque of the HSG is changed to decrease) in which the tension applied to the belt decreases.

That is, drivability fuel efficiency can be increased by quickening a control response of the electric power source (HSG) and deterioration of the durability of the belt can be prevented.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
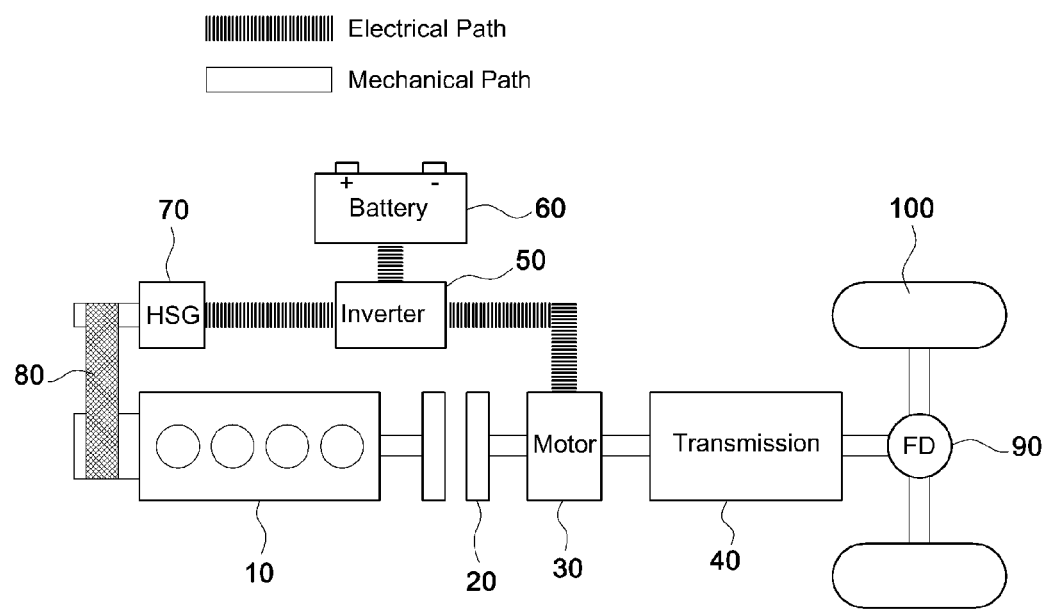
FIG. 1 (RELATED ART) is a configuration diagram illustrating a system connecting driving force by using a belt in a hybrid electric vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Referring to FIG. 1 (RELATED ART), when a hybrid starter generator (HSG) 70 having small rotational inertia is connected to an internal combustion engine 10 having relatively larger rotational inertia by a belt 80, tension acts on the belt 80 in the case of applying a torque to the electric power source 70, and in the case where there is a large change in torque, the durability of the belt 80 may deteriorate.

In order to prevent the deterioration of the durability of the belt 80, a slew rate of the torque of the electric power source 70 is set, and the torque of the electric power source is changed within a range of the set slew rate. In this case, a torque control response is delayed as large as the set slew rate.

Figure 2A:
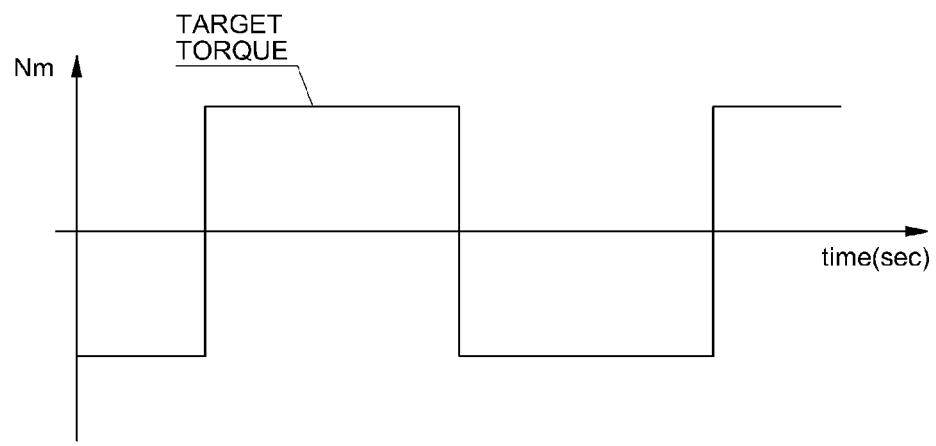
FIG. 2A (RELATED ART) is a line diagram illustrating a target torque of an electric power source.
Figure 2B:
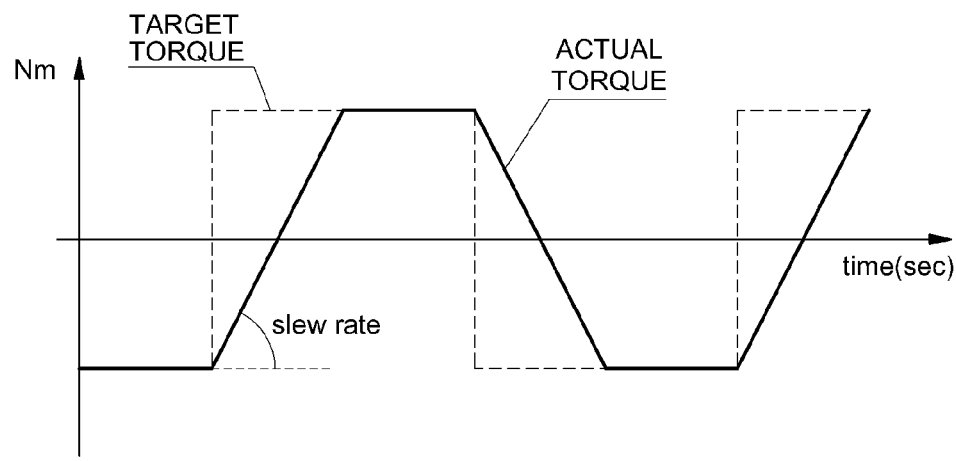
FIG. 2B (RELATED ART) is a line diagram illustrating an actual torque of the electric power source restricting a slew rate.

In the related art, when a target torque of the HSG is changed, as illustrated in FIGS. 2A and 2B, an actual torque is restricted by applying a single slew rate.

Such a torque controlling method in the related art is a representative example having a disadvantage in which the control response is delayed by applying the single slew rate regardless of an increase and a decrease of the tension.

In the present invention, in order to overcome this disadvantage, a method will be described, which increases a torque control response by increasing the slew rate in a situation in which tension which does not influence the durability of the belt decreases, by not applying the single slew rate in an entire range of controlling the torque of the HSG, and separating a situation/section in which the tension increases and a situation/section in which the tension decreases.

In the control of the torque, it is important to maximally quicken responsiveness (that is, it is important to maximally control a target torque to be the same as an actual torque), but a negative influence may be exerted on the durability of the belt, and as a result, the actual torque needs to be output by restricting the actual torque (alternatively, an actual output torque) to a predetermined slew rate as compared with the target torque (alternatively, a target output torque).

When the torque of an electric power source such as a hybrid starter generator (HSG) is changed to decrease the tension (that is, to decrease an absolute value of the torque), since the changed torque has less influence on the durability of the belt even though the torque is rapidly changed, the slew rate may be set to a larger value than the slew rate to increase the tension (that is, to increase the absolute value of the torque).

Figure 3:
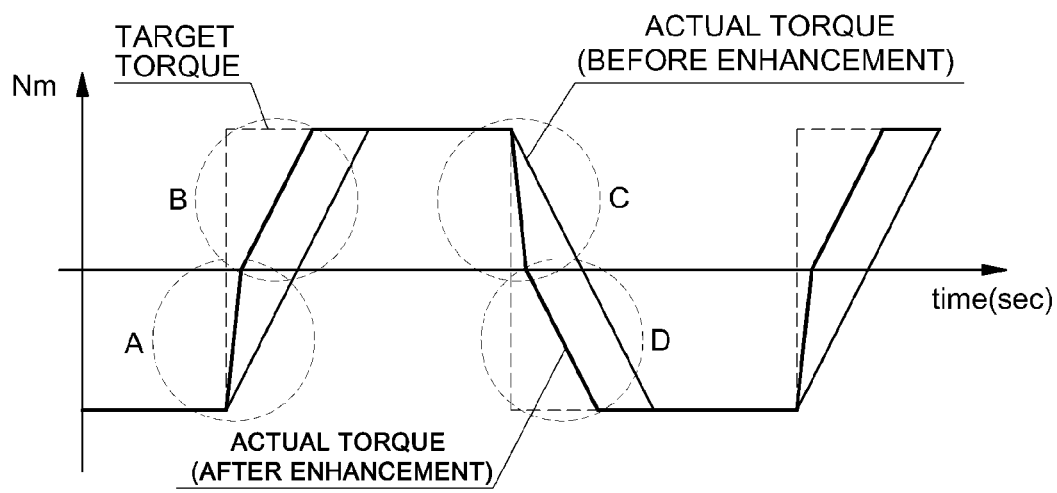
FIG. 3 is a conceptual diagram for describing a method for controlling an electric power source connected with a belt in a hybrid electric vehicle according to the present invention.

Therefore, as illustrated in FIG. 3, in a situation (A and C sections) in which the target torque is rapidly changed to decrease the tension, the actual torque is rapidly changed by setting the slew rate to a large value, and in a situation (B and D sections) in which the target torque is changed to increase the tension, the torque change rate of the actual torque is restricted by setting the slew rate to be a relatively smaller value to prevent the deterioration in durability of the belt.

Hereinafter, a preferred detailed control method of the present invention will be described with reference to the accompanying drawings so that the preferred detailed control method is easily implemented by those skilled in the art.

Herein, the target torque is a targeted torque which the HSG intends to ideally output and the actual torque as torque actually output by the HSG is an output torque of the HSG determined according to the change rate of the target torque.

As illustrated in FIG. 3, in the present invention, as a control method for restricting a change in torque of the HSG connected with the internal combustion engine through the belt in the hybrid electric vehicle, the change rate (slew rate) of the target torque is controlled by distinguishing a section in which an absolute value (size value) of the target torque of the HSG increases and a section in which the absolute value of the target torque of the HSG decreases.

In detail, in the section (the A and C sections of FIG. 3) in which the absolute value of the target torque of the HSG decreases, the change rate of the target torque is set to a larger value than the sections (the B and D sections of FIG. 3) in which the absolute value of the target torque increases.

That is, in the section in which the absolute value of the target torque of the HSG decreases, the change rate of the target torque is set to a relatively larger value and in the section in which the absolute value of the target torque of the HSG increases, the change rate of the target torque is set to a relatively smaller value.

Consequently, the actual torque value of the HSG is restricted and determined according to the change rate of the target torque.

Figure 4:
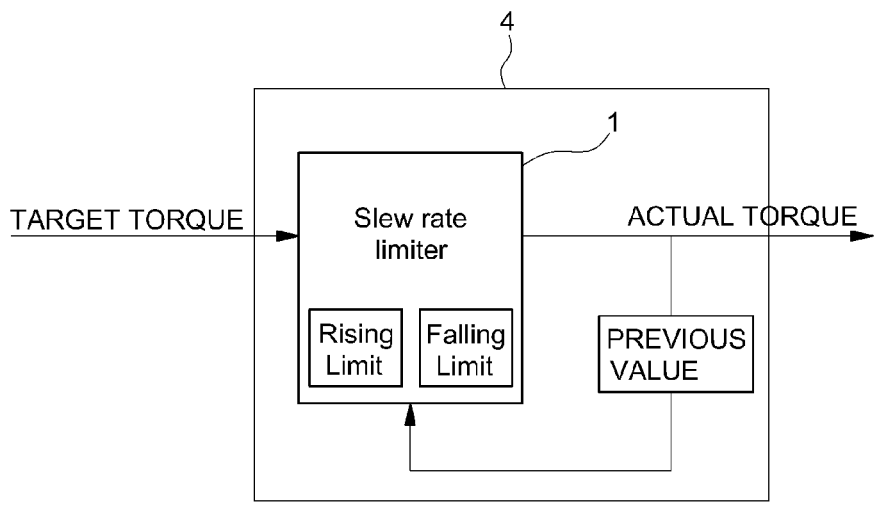
FIG. 4 is a conceptual diagram illustrating a method for controlling a torque of an electric power source using a slew rate limiter according to the present invention.

FIG. 4 is a conceptual diagram illustrating that an actual torque is determined and restricted according to a change rate of a target torque determined in a slew rate limiter 1, and the change rate of the target torque in the slew rate limiter 1 is controlled in real time by using a previous torque value.

Referring to FIG. 4, the actual torque determined according to the change rate of the target torque is fed back as the previous torque value, and a torque change is restricted by setting and determining the change rate of the target torque according to a sign of the previous torque value and an increase/decrease of the target torque.

In this case, the previous torque value is determined as a value acquired by monitoring the actual torque in real time and determined as, for example, a value acquired by sampling the actual torque per unit time (alternatively, at a predetermined time interval).

The slew rate limiter 1 of FIG. 4 sets the change rate of the target torque as a rising limit and a falling limit, which are the torque change rates determined based on the previous torque value.

The slew rate limiter 1 may be designed in a motor control unit (MCU) or a hydraulic control unit (HCU) for controlling the HSG.

Figure 5:
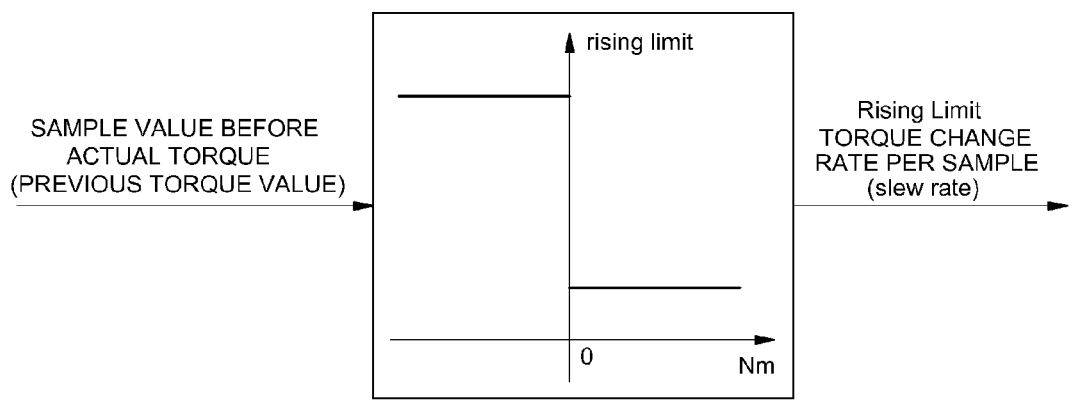
FIGS. 5 and 6 are conceptual diagrams illustrating a method for controlling a torque change rate of the electric power source using a previous torque value according to the present invention.
Figure 6:
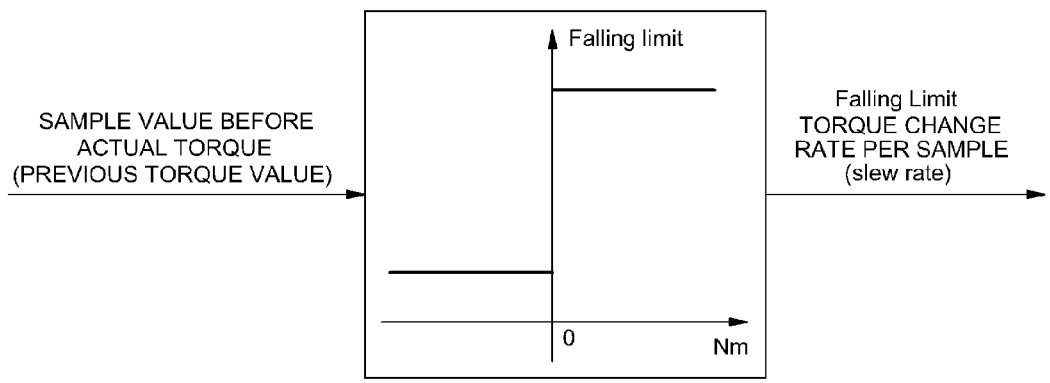

FIGS. 5 and 6 are conceptual diagrams illustrating a scheme that sets a change rate of a target torque, that is, a change rate of a current torque value by using a previous fed-back torque value.

Referring to FIGS. 5 and 6, the rising limit and the falling limit are the change rates of the current torque value of the target torque determined based on the previous torque value of the actual torque. In particular, the rising limit is the change rate of the current torque value in the section in which the target torque increases, and the falling limit is the change rate of the current torque value in the section in which the target torque decreases.

First, in the section in which the target torque to which the rising limit is applied increases, the torque change rate is set and controlled as follows.

When the previous torque value of the actual torque fed back from an output side of the slew rate limiter 1 has a negative (−) value, that is, when the target torque has the negative (−) value in the section in which the absolute value of the target torque decreases (the A section of FIG. 3), the change rate (that is, the rising limit) of the current torque value of the target torque is set to a relatively larger value to increase control response performance and when the previous torque value has a positive (+) value, that is, when the target torque has the positive (+) value in the section in which the absolute value of the target torque increases (the B section of FIG. 3), the change rate (that is, the rising limit) of the current torque value of the target torque is set to a relatively smaller value to prevent deterioration of the durability of the belt.

In other words, in the section in which the target torque increases, in the case where the previous torque value has the negative (−) value, the change rate of the target torque is set to the relatively larger value than the case where the previous torque value has the positive (+) value to control the current torque value. In this case, the current torque value is restricted by the torque change rate (that is, the rising limit) set to the larger value.

Herein, the current torque value is an actual torque value determined and output after the previous torque value.

In the section in which the target torque to which the falling limit is applied decreases, the torque change rate is set and controlled as follows.

When the previous torque value of the actual torque fed back from an output side of the slew rate limiter 1 has the positive (+) value, that is, when the target torque has the positive (+) value in the section in which the absolute value of the target torque decreases (the C section of FIG. 3), the change rate (that is, the falling limit) of the current torque value of the target torque is set to the relatively larger value to increase control response performance and when the previous torque value has the negative (−) value, that is, when the target torque has the negative (−) value in the section in which the absolute value of the target torque increases (the D section of FIG. 3), the change rate (that is, the falling limit) of the current torque value of the target torque is set to the relatively smaller value to prevent deterioration of the durability of the belt.

In other words, in the section in which the target torque decreases, in the case where the previous torque value has the positive (+) value, the change rate of the target torque is set to the relatively larger value than the case where the previous torque value has the negative (−) value to control the current torque value. In this case, the current torque value is restricted by the torque change rate (that is, the falling limit) set to the larger value.

Figure 7:
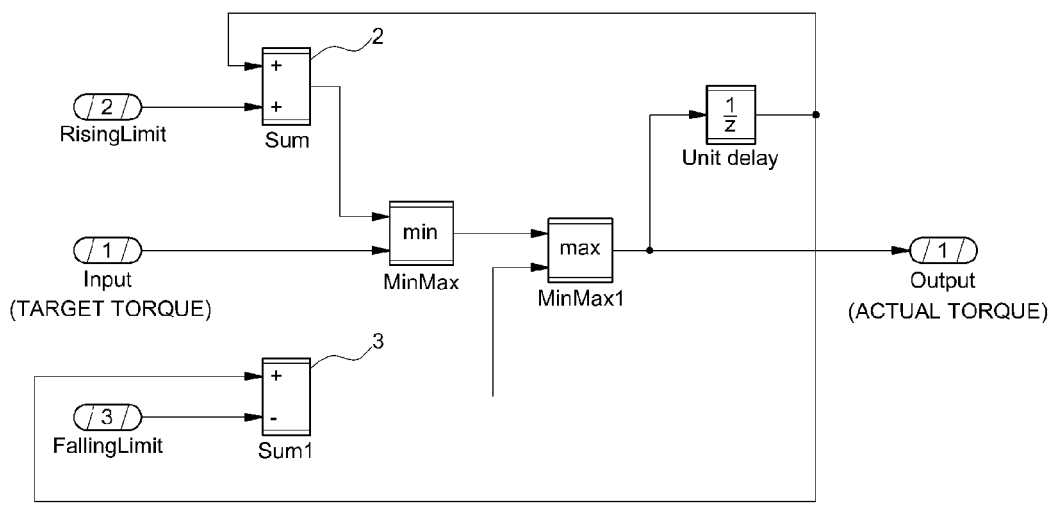
FIG. 7 is a diagram for describing an internal calculation scheme of the slew rate limiter according to the present invention.

Meanwhile, FIG. 7 illustrates an internal calculation scheme of the slew rate limiter.

Referring to FIG. 7, the slew rate limiter is configured to determine and output the actual torque by receiving the target torque as an input value and compares the firstly input target torque and a first sum value to select a smaller value (alternatively, a minimum value) of two values and compares the selected smaller value (alternatively, the minimum value) and a second sum value to select a larger value (alternatively, a maximum value) of two values to determine and output the selected value as the actual torque.

In this case, the output actual torque is delayed by a predetermined time (a unit time applied when the torque change rate/slew rate is calculated) to be fed back to a first sum unit 2 and a second sum unit 3.

In this case, the first sum value calculated by the first sum unit 2 is a value by summing the rising limit and the previous torque value, and the second sum value calculated by the second sum unit 3 is a value by subtracting the falling limit from the previous torque value.

The slew rate limiter 1 described above consequently variably controls the change rate of the target torque by distinguishing the section in which the absolute value of the target torque of the electric power source increases and the section in which the absolute value decreases, and for example, in the section in which the absolute value of the target torque of the electric power source decreases, the change rate of the target torque is determined and controlled to be the larger value than in the section in which the absolute value of the target torque increases.

In other words, the slew rate limiter 1 controls and determines the change rate of the target torque when the target torque has the negative (−) value to be the larger value than the change rate of the target torque when the target torque has the positive (+) value in the section in which the target torque of the electric power source increases, and the slew rate limiter 1 determines and controls the change rate of the target torque when the target torque has the positive (+) value to be the larger value than the change rate of the target torque when the target torque has the negative (−) value in the section in which the target torque of the electric power source decreases.

The method for variably controlling the torque change rate of the electric power source connected to the internal combustion engine by the belt may be implemented through the slew rate limiter 1 and a target torque control unit 4 having the slew rate limiter therein.

That is, referring to FIG. 4, as a control device that restricts the change of the torque of the electric power source connected with the internal combustion engine through the belt in the hybrid electric vehicle, an electric power source control device may be configured, which includes the target torque control unit 4 controlling the target torque of the electric power source and the slew rate limiter 1 arranged in the target torque control unit 4 to variably control the change rate of the target torque of the electric power source.

The target torque control unit 4 restricts the actual torque output by the electric power source according to the change rate of the target torque determined by the slew rate limiter 1, and for example, a torque instruction determined according to the change rate of the target torque of the electric power source is transmitted to the electric power source to control the output torque of the electric power source.

The target torque control unit 4 may be one of control units installed in the hybrid electric vehicle, such as the motor control unit (MCU) or the hydraulic control unit (HCU) that takes charge of controlling the electric power source, and for example, when the hydraulic control unit (HCU) controls the target torque of the electric power source as the target torque control unit 4, the hydraulic control unit (HCU) transmits the instruction for controlling the target torque to the motor control unit (MCU) to control the target torque of the electric power source.

Herein, the target torque of the electric power source is a torque having a square wave form having both the negative (−) value and the positive (+) value as illustrated in FIG. 3 and may be determined by the motor control unit (MCU) for controlling the torque of the electric power source or one of the control units installed in the hybrid electric vehicle, such as the hydraulic control unit (HCU), and the like.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A control method for restricting a change in torque of an electric power source connected with an internal combustion engine through a belt in a hybrid electric vehicle, wherein a change rate of a target torque is controlled by distinguishing a section in which an absolute value of the target torque of the electric power source increases and a section in which the absolute value decreases, wherein in the section in which the absolute value of the target torque decreases, the change rate of the target torque is determined to be a larger value than in the first section in which the absolute value of the target torque increases.

2. The control method of claim 1, wherein the target torque is a torque in a square wave form having both a negative (−) value and a positive (+) value.

3. A control method for restricting a change in torque of an electric power source connected with an internal combustion engine through a belt in a hybrid electric vehicle, wherein an actual torque determined according to a change rate of a target torque of the electric power source is monitored to be fed back as a previous torque value, and the change rate of the target torque is determined based on increase and decrease states of the previous torque value and the target torque, wherein the change rate of the target torque when the previous torque value has a negative (−) value is determined to be a larger value than the change rate of the target torque when the previous torque value has a positive (+) value in the section in which the target torque increases.

4. The control method of claim 3, wherein the change rate of the target torque when the previous torque value has a positive (+) value is determined to be a larger value than the change rate of the target torque when the previous torque value has a negative (−) value in a section in which the target torque decreases.

5. A control device for restricting a change in torque of an electric power source connected with an internal combustion engine through a belt in a hybrid electric vehicle, the control device comprising:
 a target torque control unit controlling a target torque of the electric power source; and
 a slew rate limiter arranged in the target torque control unit and variably controlling a change rate of the target torque,
 wherein the slew rate limiter controls a change rate of the target torque by distinguishing a first section in which an absolute value of the target torque of the electric power source increases and a second section in which the absolute value decreases.

6. The control device of claim 5, wherein in the second section in which the absolute value of the target torque decreases, the slew rate limiter determines the change rate of the target torque to be a larger value than in the first section in which the absolute value of the target torque increases.

7. The control device of claim 5, wherein the slew rate limiter monitors an actual torque determined according to a change rate of a target torque of the electric power source as a previous torque value and determines the change rate of the target torque based on increase and decrease states of the previous torque value and the target torque.

8. The control device of claim 7, wherein the slew rate limiter determines the change rate of the target torque when the previous torque value has a negative (−) value to be a larger value than the change rate of the target torque when the previous torque value has a positive (+) value in a section in which the target torque increases.

9. The control device of claim 7, wherein the slew rate limiter determines the change rate of the target torque when the previous torque value has a positive (+) value to be the larger value than the change rate of the target torque when the previous torque value has a negative (−) value in a section in which the target torque decreases.

10. The control device of claim 5, wherein the target torque is a torque in a square wave form having both a negative (−) value and a positive (+) value.

* * * * *